United States Patent [19]

Oizumi

[11] 4,454,942
[45] * Jun. 19, 1984

[54] SYSTEM FOR CONVEYING CONICAL ARTICLES

[75] Inventor: Yoshio Oizumi, Ibaragi, Japan

[73] Assignee: Yamakyu Automatics Co., Ltd., Osaka, Japan

[*] Notice: The portion of the term of this patent subsequent to Jul. 7, 1998 has been disclaimed.

[21] Appl. No.: 314,515

[22] Filed: Oct. 23, 1981

[51] Int. Cl.³ .............................................. B65G 47/26
[52] U.S. Cl. .................................... 198/424; 198/466
[58] Field of Search ............... 198/424, 432, 775, 492, 198/626, 466, 851

[56] References Cited

U.S. PATENT DOCUMENTS

| | | | |
|---|---|---|---|
| 2,471,479 | 5/1949 | Coons | 198/492 X |
| 3,059,756 | 10/1962 | West | 198/626 X |
| 3,964,233 | 6/1976 | Thomas | 198/424 X |
| 4,197,935 | 4/1980 | Aterianus et al. | 198/466 X |
| 4,276,980 | 7/1981 | Oizumi | 198/851 |

Primary Examiner—Joseph E. Valenza
Assistant Examiner—Dennis J. Williamson
Attorney, Agent, or Firm—Armstrong, Nikaido, Marmelstein & Kubovcik

[57] ABSTRACT

An apparatus for conveying conically shaped articles from a first conveyor to a second conveyor. The first conveyor comprises a plurality of circulating chains which are spaced from one another by a distance less than the largest diameter of the conical article such that the article will be suspended between the chains as it is conveyed. The second conveyor consists of a belt which supports article receiving stands. Arranged between the conveyors is an article transfer device which consists of two relatively movable pieces which guide the article vertically from the first to the second conveyor. Article transfer is controlled by a plurality of gates as well as by article, transfer device, and receiving member sensors.

3 Claims, 15 Drawing Figures

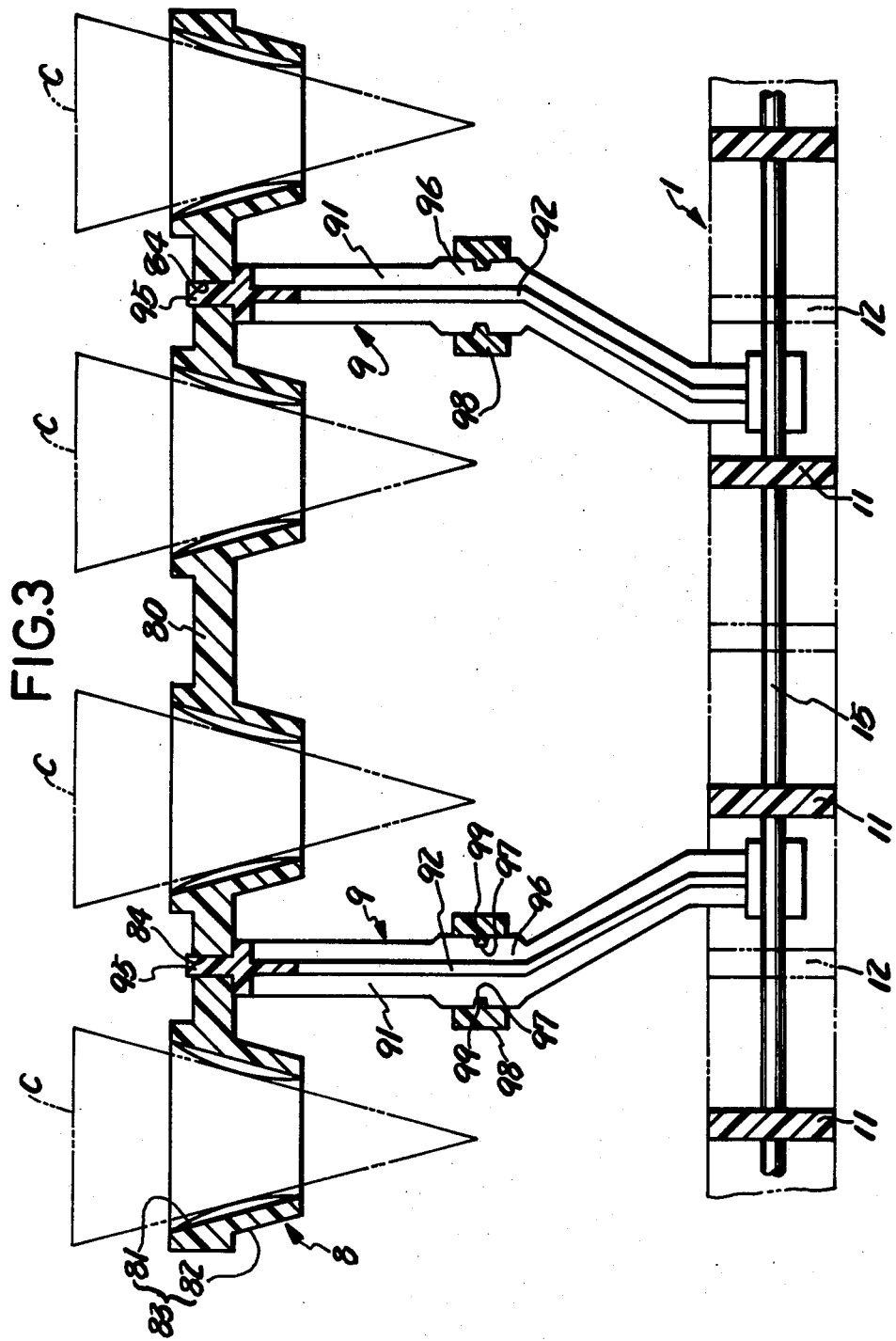

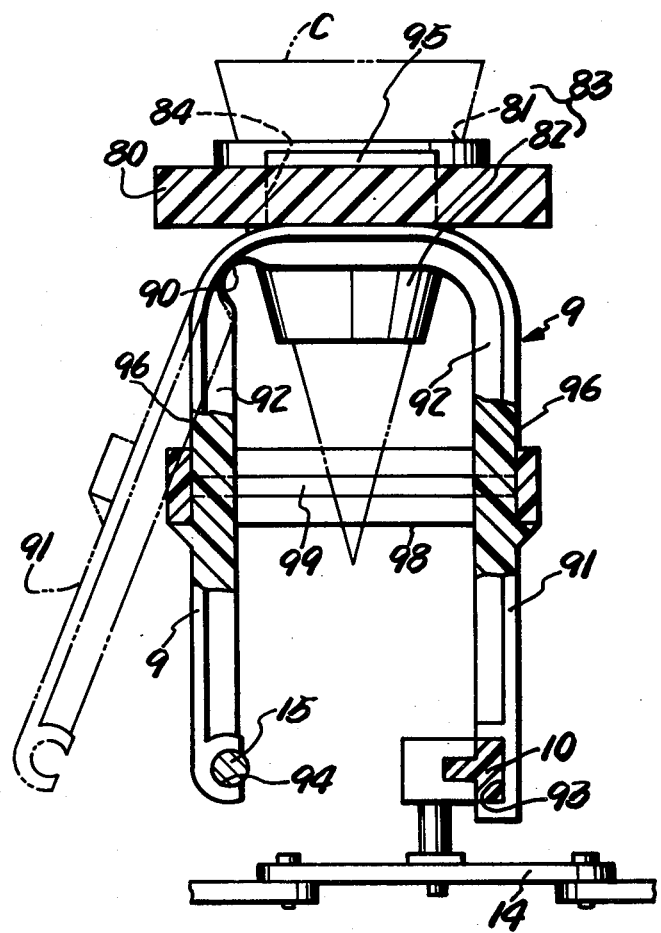

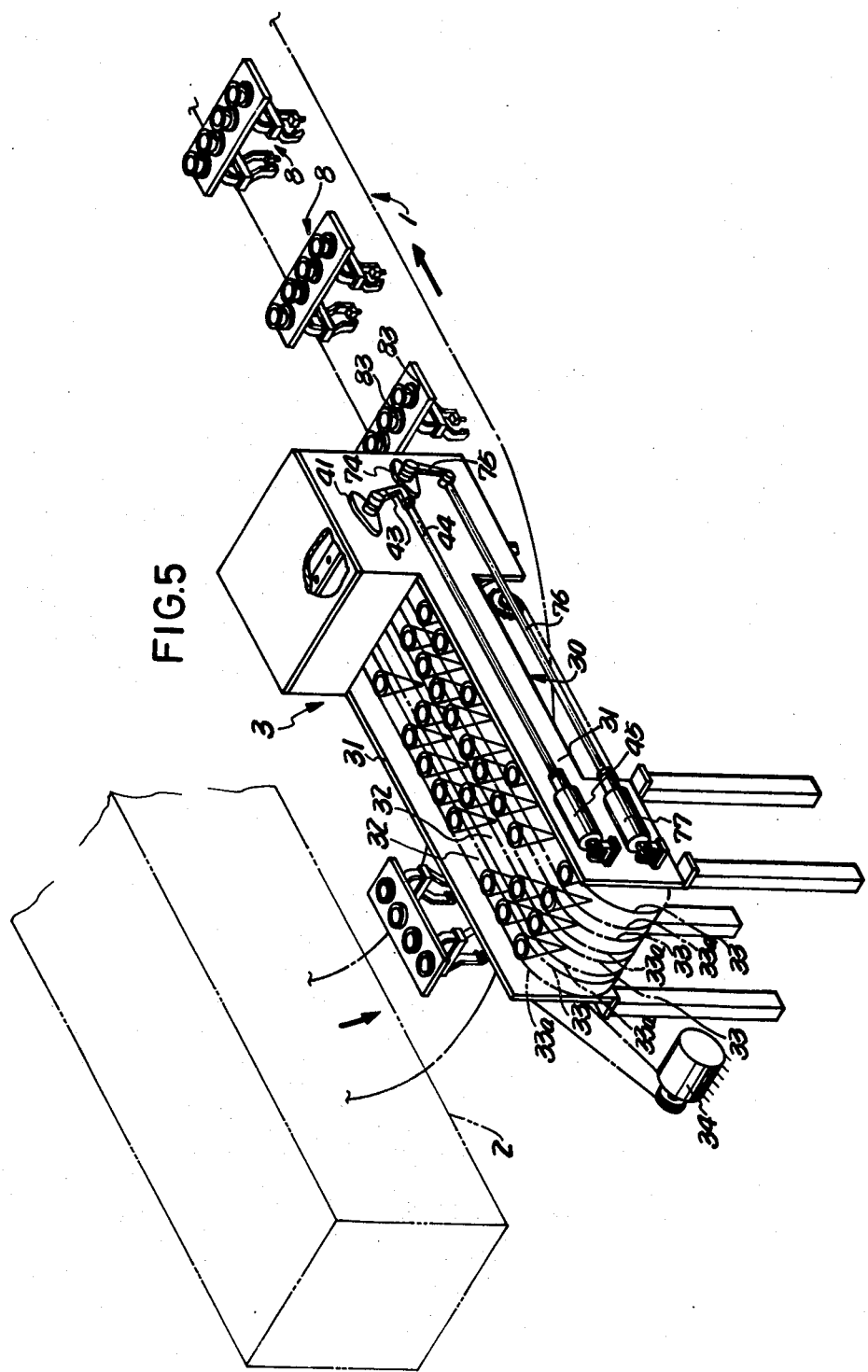

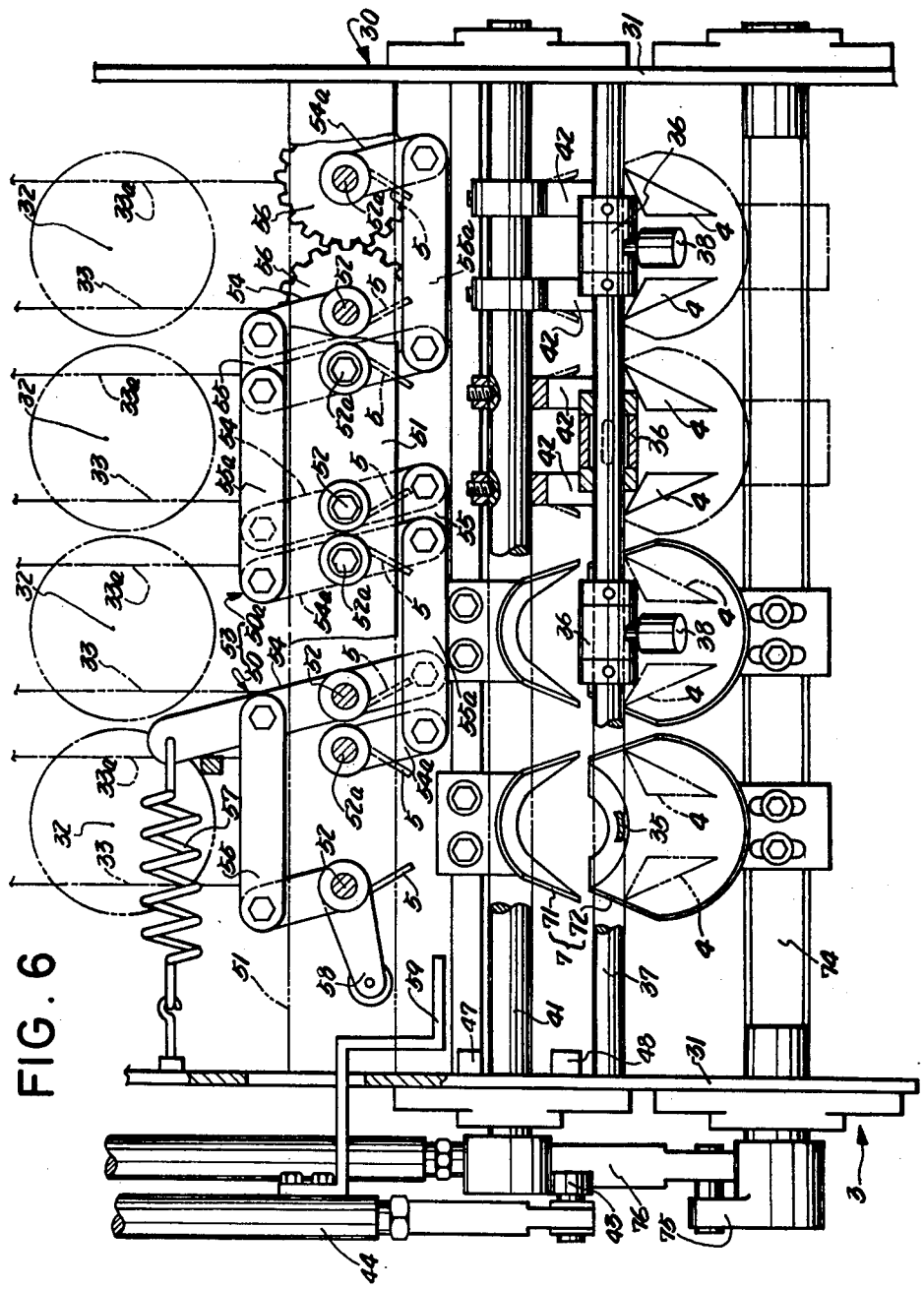

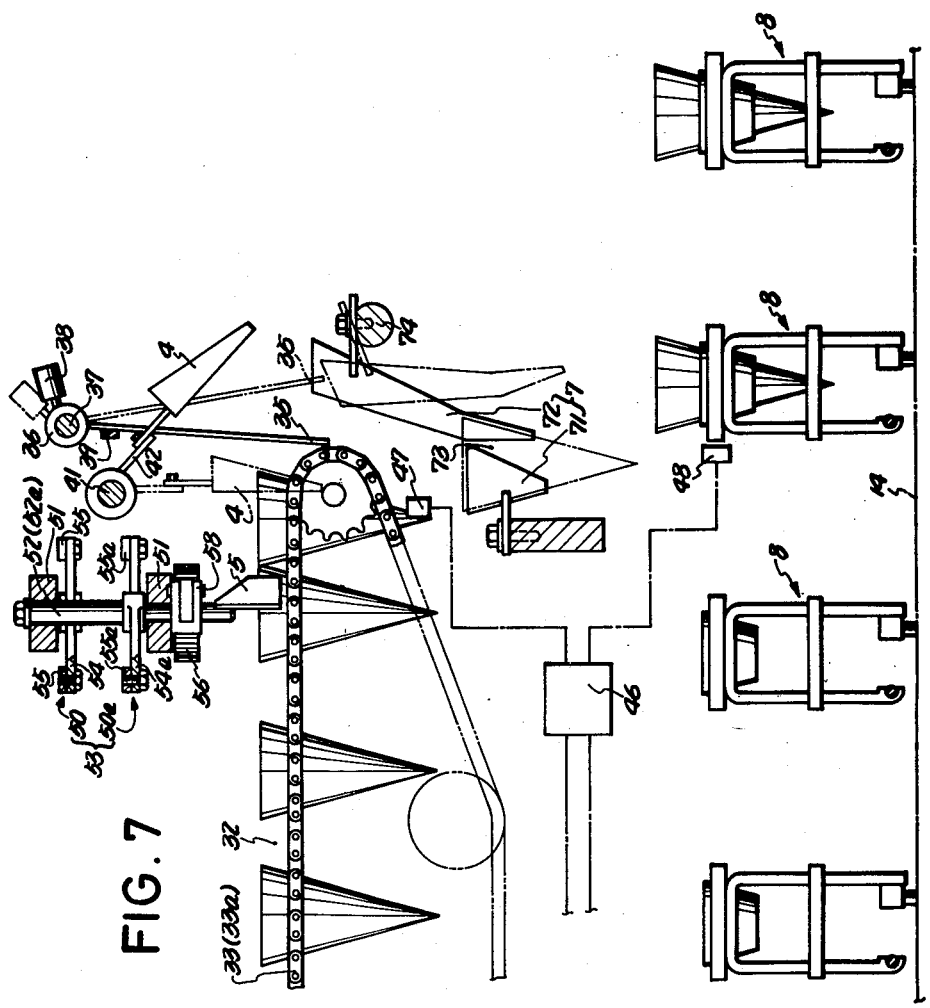

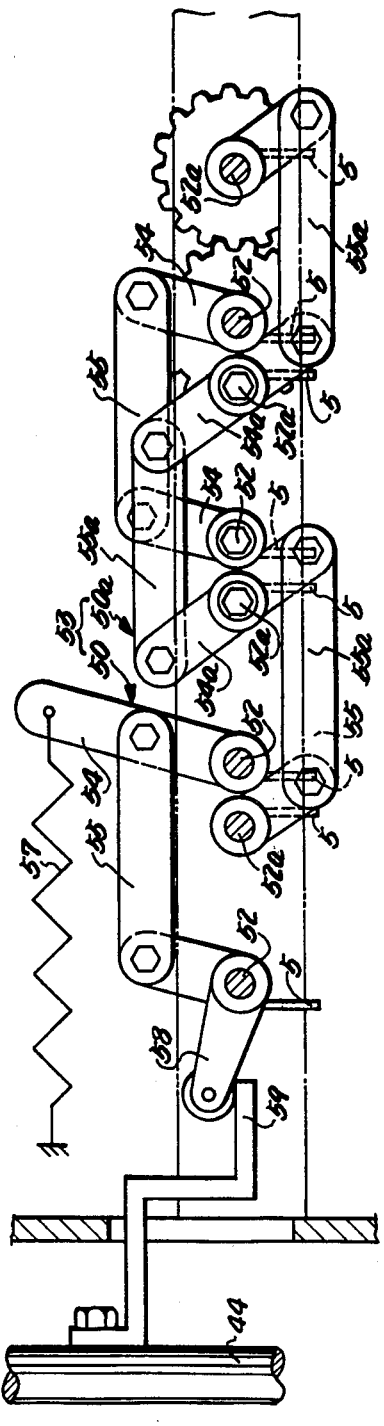

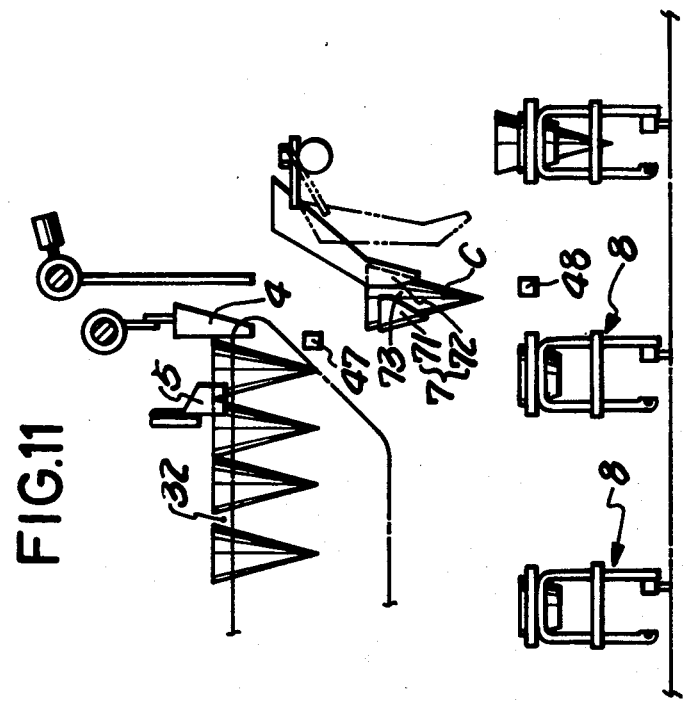
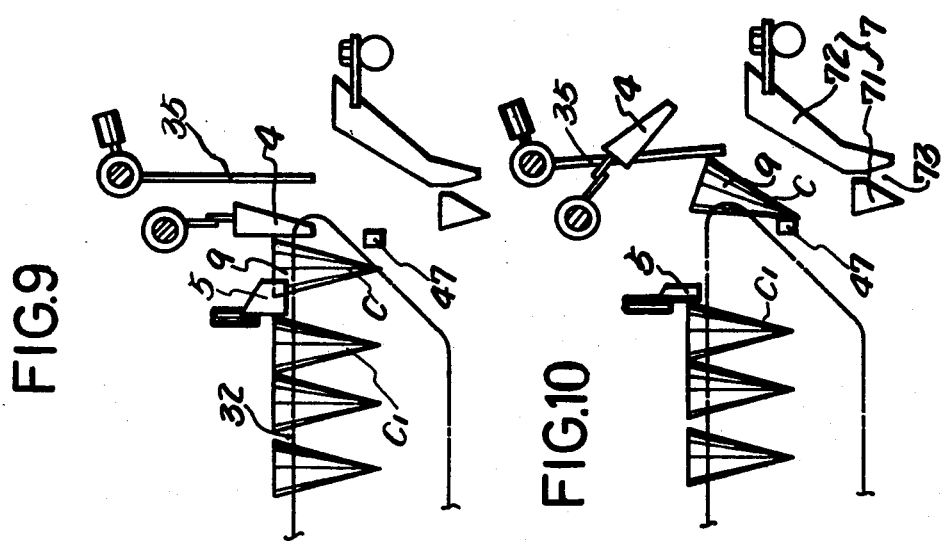

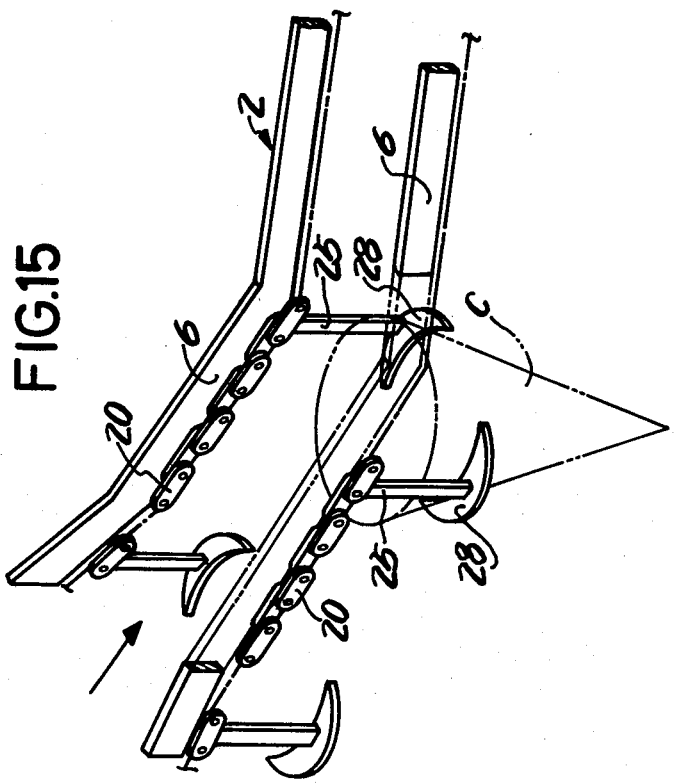
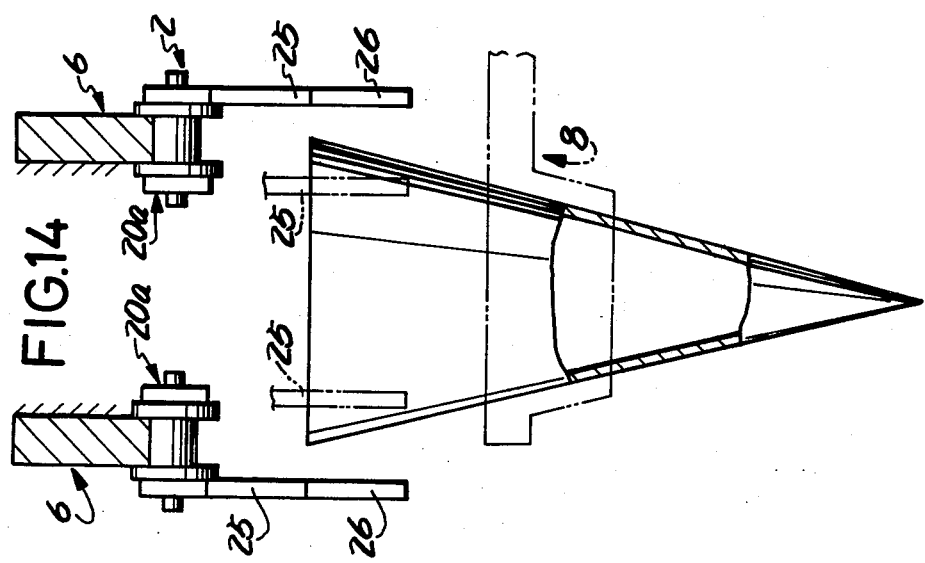

SYSTEM FOR CONVEYING CONICAL ARTICLES

BACKGROUND OF THE INVENTION

Articles can be efficiently transferred from a feeder to a circulating conveyor belt usually by a pusher when the articles are hard and in the form of plates, flat bodies, etc. which can be placed on the belt with stability.

However, many difficult technical problems are encountered in the case of conical paper containers having an ice cream mixture contained therein because the containers are prone to deformation and shaped very unstably and yet must be transferred in an upright position.

While the conveyor belt for transporting conical articles must be equipped with special stands thereon, stands are not known by which conical articles can be supported stably and which are easily mountable on and demountable from the conveyor belt.

SUMMARY OF THE INVENTION

An object of the present invention is to provide a system comprising a pair of circulating chains for transferring conical articles with the article held between the chains utilizing the conical shape of the article, and main shutters and subshutters disposed at a downstream portion of the path of transfer of the article and adapted to be opened and closed alternately for feeding the articles one by one efficiently and properly without deforming the articles.

Another object of the present invention is to provide an article support stand which is adapted to clamp a support bar and a connecting rod of each unit segment of a conveyor belt for removably supporting conical articles thereon with ease and stability despite the special shape of the article while reducing the influence to be exerted on the articles by the vibration of the conveyor belt.

BRIEF DESCRIPTION OF THE DRAWINGS

FIG. 3 is a view in section taken along the line III—III in FIG. 2;

FIG. 4 is a view in section taken along the line IV—IV in FIG. 2;

FIG. 5 is a perspective view showing a feeder;

FIG. 6 is a fragmentary plan view showing the feeder;

FIG. 7 is a fragmentary view in section showing the feeder;

FIG. 8 is a plan view showing an opening assembly;

FIGS. 9, 10 and 11 are views illustrating the operation of the feeder;

FIG. 13 is a plan view showing the spacing between guide rods 6 in FIG. 12.

FIG. 14 is a view in section taken along the line XIV—XIV in FIG. 12; and

FIG. 15 is a perspective view showing another embodiment.

DETAILED DESCRIPTION OF THE INVENTION

Description of Construction

Figure 1:
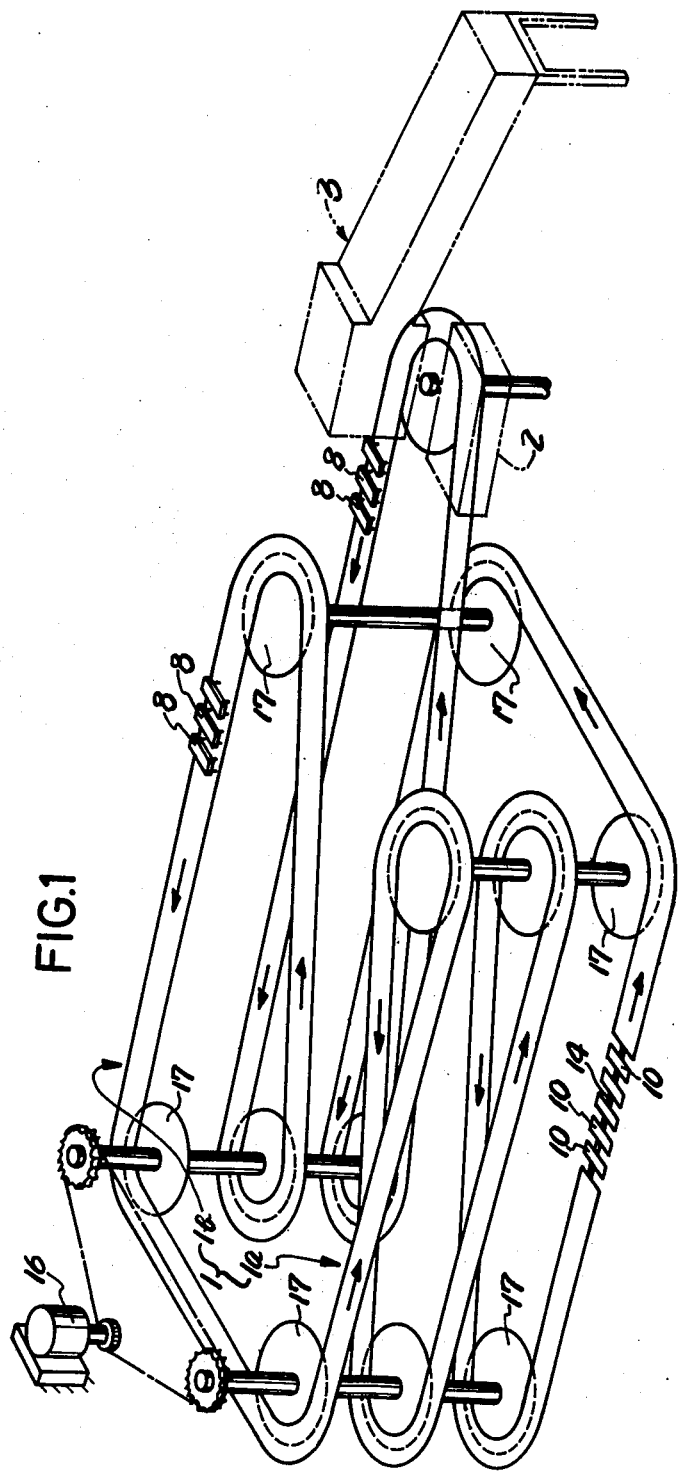
FIG. 1 is an overall view showing a conveying system.

FIG. 1 shows a conveyor belt 1 provided within a food quick freezing chamber, and an article feeder 3 and an article delivering assembly 2 above the belt 1.

The conveyor belt 1 includes a helically descending conveyor section 1a and a helically ascending conveyor section 1b which are connected together at their upper ends and lower ends and is driven by a motor 16 for circulation.

With the present embodiment, conical paper containers having an ice cream mixture placed therein are successively transferred onto support stands 8 on the conveyor belt 1 by the feeder 3, circulated through the interior of the freezing chamber over a period of time needed for solidifying the ice cream mixture and lifted from the support stands 8 by the delivering assembly 2 disposed adjacent the feeder 3 for delivery.

The present invention can be embodied for conveying not only the ice cream container mentioned but also any other conical articles. The conveyor belt can of course be circulated in a horizontal plane.

Figure 2:
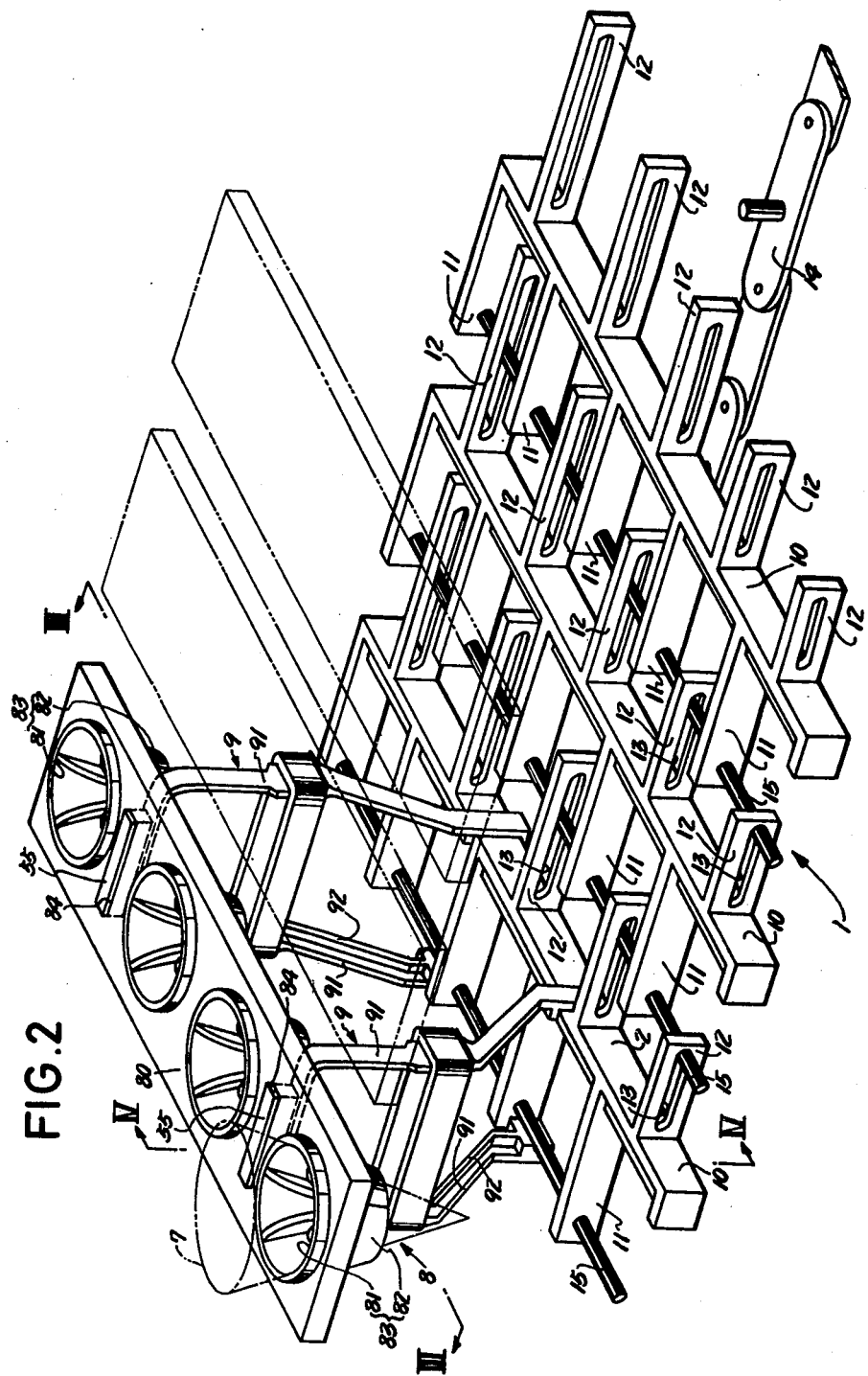
FIG. 2 is a perspective view showing a support stand as attached to a conveyor belt.
Figure 12:
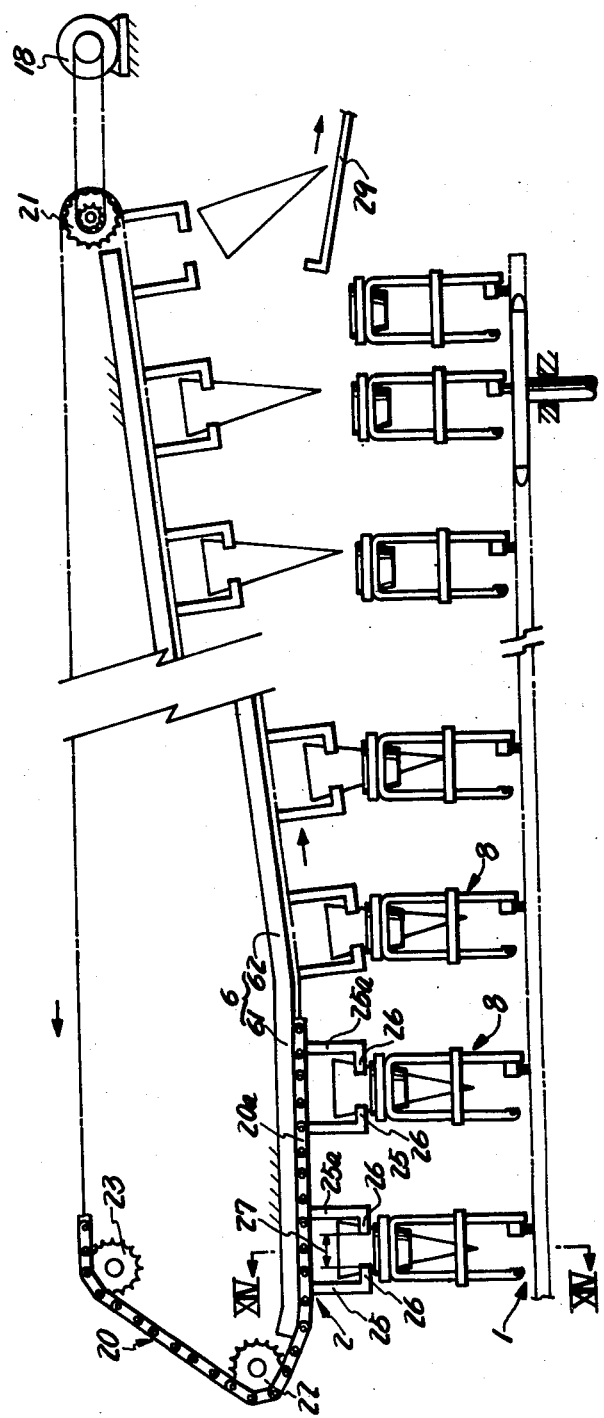
FIG. 12 is a front view showing a delivering assembly.

As seen in FIG. 2, the conveyor belt 1 comprises an endless drive chain 14 reeved around wheels 17, 17 and support bars 10 pivotally supported on the chain 14 and equidistantly arranged. Branches 11, 12 extend from the opposite sides of each support bar 10.

A connecting rod 15 fixed to the branches 11 on one side of one bar 10 is slidably fitted in slots 13 formed in the branches 12 on the other side of another support bar 10 adjacent the bar 10.

The conveyor belt 1 travels smoothly at the corners of the path of transport in a circular arc form, with the distance between the adjacent support bars 10, 10 increased at their outer ends and decreased at their inner ends.

The article support stand 8 comprises a pair of opposed arched legs 9, 9 which are connected together by a bridge plate 80. The legs 9 and bridge plate 80 are all made of synthetic resin, such as nylon 1018, which is lightweight and resistant to low temperatures.

The bridge plate 80 has a plurality of receiving portions 83 in conformity with the shape of the article to be conveyed and arranged on a line perpendicular to the direction of transport.

Since the article to be transported is an ice cream container C in the form of an inverted cone, the receiving portion 83 has a conical wall 82 projecting downward from the periphery of a circular aperture 81 formed in the bridge plate 80.

Slits 84, 84 for attaching the legs 9, 9 are formed in opposite side portions of the bridge plate 80 in parallel to each other.

Each of the legs 9, 9 includes two leg pieces 91, 91 which are bent downward to an arch form towards the free ends. The leg is formed on its inner side with a reinforcing rib 92. At one corner of the inner side of the leg, the rib 92 is cut out as indicated at 90 in FIG. 4. The leg piece 91 extending from the corner 90 is biased outward at all times as indicated in broken lines by the elastic restoring force of the resin.

The leg pieces 91, 91 are formed on the inner side of their lower ends with recessed engaging portions 93, 94 in which the support bar 10 and connecting rod 15 of the conveyor belt 1 are fittable respectively. The engaging portion 93 is channel-shaped to receive the support bar 10 therein, while the other engaging portion 94 is semi-circular to receive the rod 15 therein.

The leg 9 has at its top a projection 95 which is fittable in the slit 84 of the bridge plate 80.

As shown in FIG. 3, each of the leg pieces 91, 91 has a midportion of increased width, 96, having recesses 97 in the side edges.

The leg 9 has a ring 98 made of the same material as the leg, fitted around the leg pieces 91, 91 and vertically movable. The ring 98 has on its inner side projections 99 engageable in and disengageable from the recesses 97 of the leg pieces 91, 91.

To assemble the support stand 8 and attach the stand to the conveyor belt 1, the ring 98 is first fitted around the leg 9, and the projection 95 on the leg is then fitted in the slit 84 of the bridge plate 80. When desired, the projection 95 may be fixed to the plate 80 with an adhesive.

The engaging portions 93, 94 at the lower ends of the leg pieces 91, 91 are fitted to the connecting rod 15 and support bar 10 of the belt 1 sidewise by forcing the leg pieces inward with the hand. The ring 98 is lowered to fit the projection 99 thereon in the recesses 97 of the leg pieces 91, whereby the leg pieces 91, 91 are prevented from expansion. With the legs 9, 9 thus clamping the support bar 10 and connecting rod 15, the support stand 8 is attached to the conveyor belt 1 by the four leg pieces 91.

The feeder 3 is disposed at the corner of the lower end of the ascending conveyor section 1b of the conveyor belt 1 and has a frame 30 the downstream side of which is positioned above the belt 1.

With reference to FIG. 5, parallel transfer paths 32 corresponding in number to the number of the receiving portions 83 of the stand 8 are provided between side plates 31, 31 of the frame 30. Each of the transfer paths 32 is provided with two parallel circulating chains 33, 33a which are spaced apart by a distance slightly smaller than the largest diameter of the container C.

The chains 33, 33a are all driven at the same speed by a motor 34 coupled thereto and equipped with speed reduction means to transport containers C each of which is supported at upper side portions thereof by the chains 33, 33a.

As shown in FIGS. 6 and 7, the transfer path 32 is provided at a downstream portion with main shutters 4 and subshutters 5 for controlling the transfer of the container C.

More specifically a pair of main shutters 4 is disposed at the downstream end of each transfer path 32. The main shutters 4 are attached in a downstream position by brackets 42 to a support rod 41 which is rotatably disposed above the transfer paths 32. The pair of main shutters 4 closes the path 32 in a specified position.

A cylinder or like reciprocatingly driving means 45 is coupled to one end of the support rod 41 via a lever 43 and an operating rod 44.

In response to each signal emitted from the control unit 46 to be described later, the driving means 45 turns the support rod 41 to reciprocate the main shutters 4 once, i.e. to open the shutters 4 upward to open the transfer path 32 and thereafter lower the shutters to close the path 32.

Upper and lower two parallel frames 51, 51 are provided on the upstream side of the support rod 41. A pair of vertical rods 52, 52a disposed on the opposite sides of each transfer path 32 extend through and are rotatably supported by the parallel frames. A pair of subshutters 5, 5 fixed to the lower ends of the vertical rods 52, 52a at the opposite sides of the path 32 are turnable in opposite directions to each other to open or close the path 32.

As shown in FIGS. 6 and 8, an assembly 53 for opening or closing the subshutters 5 comprises link means 50 and link means 50a. The vertical rods 52, 52a have arms 54, 54a respectively. The adjacent arms 54 on the opposite sides of each arm 54a are connected together by a link 55 to provide the link means 50, and the other arms 54a are interconnected by links 55a to provide the link means 50a. A pair of vertical rods 52, 52a are coupled by gears 56, 56 to transmit a reverse motion from one link means 50 to the other link means 50a.

A spring 57 is connected to one of the two link means 50, 50a to bias the subshutters 5, 5 in the closing direction. Further one of the link means has an operating arm 58 carrying a roller.

A pushing plate 59 engageable with the operating arm 58 is fixed to the operating rod 44 for the main shutters 4.

When the operating rod 44 is so positioned as to cause the shutters 4 to close the transfer path 32 at the specified position, the pushing plate 59 pushes the operating arm 58 as shown in FIG. 8, causing the two link means 50, 50a to turn the pair of vertical rods 52, 52a for each path 32 in a direction to open the subshutters 5.

While the operating rod 44 is so positioned that the main shutters 4 are held open, the pushing plate 59 is away from the operating arm 58 as shown in FIG. 6. The subshutters 5 therefore hold the paths 32 closed by being biased by the spring 57.

A contact plate 35 is pivotably suspended in each transfer path 32 a small distance downstream from the main shutters 4.

A support tube 36 perpendicular to the length of the contact plate 35 is attached to the upper end of the plate 35 and fitted around a rod 37 provided between the side plates 31, 31 of the frame 30. The support tube 36 has a weight 38 for biasing the contact plate 35 in an upstream direction. The contact plate 35 bears against a stopper 39 and retains an approximately vertical position with its lower end positioned in the path of transfer 32.

Below the downstream end of the transfer path 32, there is disposed an assembly 7 for receiving the container C falling off the path 32.

The receiving assembly 7 comprises a receiving piece 71 fixedly provided on the upstream side of path of fall of the container C and an opening piece 72 disposed on the downstream side of the receiving piece 71 and movable toward or away from the receiving piece 71 for forming a space 73 between the pieces 71 and 72 to receive the container C therein.

The opening piece 72 is fixedly but position-adjustably mounted on a drive shaft 74 extending between and supported by the side plates 31, 31 of the frame 30. The opening piece 72 is turnable toward or away from the receiving piece 71 in a vertical plane by an air cylinder or like reciprocatingly driving means 77 as shown in FIG. 5 which is coupled by a lever 75 and an operating rod 76 to one end of the drive shaft 74.

At a suitable downstream portion of the transfer path 32, there is disposed a container detector 47, such as a photoelectric tube, for detecting that a container C has reached the downstream end of the path 32. A stand detector 48, similar to the detector 47, is provided below the receiving assembly 7 for detecting that a stand 8 on the conveyor belt 1 has been brought to a position immediately below the assembly 7. These two detectors 47, 48 feed signals to the control unit 46.

The control unit 46 operates the driving means 77 for the receiving assembly 7 in response to every signal emitted from the stand detector 48, moving the opening pieces 72 away from the receiving pieces 71 to allow containers C to fall onto the stand 8 and thereafter closing the pieces 72 again. Further in response to a signal from the container detector 47 detecting a container at the downstream end and when the opening pieces 72 are closed after reciprocating as above, i.e. when the receiving assembly 7 is empty, the control unit 46 operates the driving means 45 for the main shutters 4 to open and then immediately close the main shutters 4.

Adjacent the feeder 3, the delivering assembly 2 is provided above the conveyor belt 1 at an upstream location.

The delivering assembly 2 comprises two endless chains 20, 20 arranged side by side at the opposite sides of each path of transfer of containers C and support pieces 25 attached to the chains and engageable with containers C.

Each of the chains 20 is reeved around an upstream sprocket 22, downstream sprocket 21 and tension sprocket 23 and is driven at the same speed of travel as the conveyor belt 1 by a motor 18 equipped with speed reduction means and coupled to the sprocket 21.

Above the lower sections 20, 20a of the chains 20, guide bars 6, 6 are arranged as opposed to each other for guiding the travel of the lower chain sections 20a.

The guide bars 6, 6 have a horizontal upstream section 61 in parallel to the conveyor belt 1 and a slanting downstream section 62 continuous with the horizontal section 61 and extending progressively upward.

In the horizontal section 61, the guide bars 6, 6 are slightly bent inward toward each other approximately at the middle portions thereof as seen in FIG. 13. At the upstream side of this section 61, the distance 64 between the guide bars 6, 6 in parallel is slightly larger than the largest diameter of the conical container C. The bars 6 extend from their bent portions 63 toward the downstream end of the horizontal section 61 with a progressively reducing spacing. The distance 65 between the bars 6, 6 at the downstream end of the horizontal section 61 is slightly smaller than the largest diameter of the conical container C.

The bars 6, 6 further extend into the slanting section 62 as spaced apart by the smaller distance 65. The bars 6, 6 then extend downstream at an increasing spacing and thereafter extend in parallel as spaced apart by a distance larger than the largest diameter of the container C.

Each of the endless chains 20, 20 has pairs of support pieces 25 which are arranged at the same spacing as the stands 8 on the belt conveyor 1. These support pieces have forward ends which are bent at a right angle forward and rearward alternately. The bent ends 26, 26 of the support pieces 25, 25a in each pair on the chain 20 are opposed at each other as spaced apart by a distance 27 which is smaller than the largest diameter of the container C. One pair of support pieces 25, 25a on one of the endless chains 20 and one pair of support pieces 25, 25a on the other chain 20, i.e. four support pieces 25, 25a, form a group to pick up a container C by holding an upper portion thereof. When the chains 20, 20 travel along the horizontal section 61 of the guide bars 6, the bent ends 26 of the support pieces 25 are at a level slightly lower than the upper end of the container C on the conveyor belt 1.

The chains 20 and the belt 1 are driven with such timing that in the horizontal section 61 of the guide bars 6, one group of support pieces 25, 25a on the lower chain sections 20a will be positioned immediately above the receiving portion 83, in the corresponding path of transport, of the support stand 8 on the belt 1.

FIG. 15 shows another embodiment of support pieces 25. Each of the support pieces 25 shown has a circular arc holder 28 at its free end. The container C is lifted as held between the opposed holders 28, 28 on endless chains 20, 20. Thus two support pieces 25, 25 coact as a group to lift the container C.

Description of Operation

Containers C filled with an ice cream mixture are placed between each pair of circulating chains 33, 33a of the feeder 3 manually or by an automatic device.

The containers C are transported by the travel of the chains 33, 33a. When a container C has reached the downstream end of each transfer path 32 passing the subshutters 5 holding the path 32 open as seen in FIG. 9, the driving means 45 operates in response to a signal from the container detector 47 to open the main shutters 4 as seen in FIG. 10. At the same time, the pushing plate 59 on the operating rod 44 of the driving means 45 moves away from the operating arm 58 of the opening-closing assembly 53 for the subshutters 5 as seen in FIG. 6, causing the spring 57 to operate the assembly 53 to close the subshutters 5, which in turn prevent the advance of the following container $C_1$ irrespective of the travel of the chains 33, 33a.

The container C at the downstream end falls by being guided by the chains 33. At this time, the forward side edge of the top portion of the container C comes into contact with the contact plate 35 in the front and moves while pushing the contact plate 35 which is biased by the weight 38, with the result that the container C, although heavier at its upper portion, falls in a stable, substantially upright position without turning forward and fits in the space 73 between the receiving piece 71 and the opening piece 72 as shown in FIG. 11.

At this time, the main shutters 4 and the subshutters 5 return to their specified positions. Consequently the main shutters 4 close the transfer path 32, while the subshutters 5 open the path 32 in preparation for the next operation.

Even when the next container $C_1$ reaches the downstream end of the transfer path 32 in this state, the main shutters 4 will not open irrespective of the presence or absence of a signal from the container detector 47, before the opening piece 72 of the receiving assembly 7 performs a stroke of reciprocation, that is, before a signal is emitted indicating that the container C has been released from the assembly 7. Thus more than one container will not be placed onto the assembly 7.

The driving means 77 reciprocates the opening piece 72 once in response to a signal from the stand detector 48 sensing that a stand 8 is brought to a position immediately below the assembly 7 by the belt 1. Thus the opening piece 72 is opened to allow the container C to fall onto the corresponding receiving portion 83 of the stand 8 therebelow, whereupon the piece 72 is closed again.

The main shutters 4, subshutters 5 and receiving assemblies 7 for all the transfer paths 32 perform the foregoing operation at the same time, so that when containers are positioned at the downwstream ends of the paths 32 as supported by the pairs of chains 33, 33a, the containers are fed to the receiving portions 83 of one stand 8 at the same time.

The above operation is repeated every time another stand 8 passes below the receiving assemblies 7. Consequently conical containers can be fed to the conveyor belt 1 efficiently and properly.

Because the support stand 8 is attached in a stable position to the conveyor belt 1 by the four leg pieces 91 and is therefore almost free from the influence of the vibration or shake of the belt 1, the ice cream mixture will not overflow the container.

While the container C travels through the ascending conveyor section 1b and descending conveyor section 1a over a specified period of time, the ice cream mixture is frozen and solidified.

When the container C passes below the delivering assembly 2 in the upstream section of the endless chains 20, 20, the container upper portion is loosely placed into the space surrounded by the group of support pieces 25, 25a, 25, 25a extending downward from the opposed chains 20, 20, since the spacing 64 between the chains in this section is larger than the largest diameter of the container C. As the conveyor belt 1 and the chains 20 further travel at equal speeds in this state, the support pieces 25, 25a of the group come into contact with the upper portion outer pierphery of the container C where the chains 20, 20 are spaced apart by a reduced distance. When the chains 20 further ascend along the slanting section 62 of the guide bars 6, the group of support pieces 25, 25a lifts the container C from the receiving portion 83 of the stand 8.

Since the container C is in the form of a cone having a progressively increasing diameter toward its upper end, the container will not slip off the four support pieces 25, 25a.

The distance between the endless chains 20, 20 toward the downstream end of the slanting section 62 is again larger than the largest diameter of the container C, so that the container C falls off the support pieces 25, 25a, slides down a chute 29 provided therebelow and is thereby discharged from the freezing chamber.

Because the ice cream in the container C has been completely solidified by this time, no objection will result even if the container is brought into a horizontal position. When an empty stand 8 passes below the feeder 3, containers C are fitted therein again. Through the repetition of the above operation, the ice cream mixture filling the conical containers can be frozen efficiently.

According to the present invention, the main shutters 4 and the subshutters 5 of the feeder 3 are opened and closed in a reverse timing relation to each other. The second container C₁ at the downstream end is therefore prevented from advancing by the subshutters 5 when the first container C at the downstream end is allowed to fall upon opening of the main shutters 4. Further because the receiving assembly 7 for temporarily receiving the container C is provided in the path of fall of the container C, such that the main shutters 4 are operated only after the assembly 7 has released the container by a stroke of the opening piece 72, more than one container C will not be placed onto the assembly 7 at the same time. Consequently containers C can be fed properly one by one every time the opening piece 72 of the receiving assembly 7 is reciprocated by one stroke.

Further because the container C is unlikely to be subjected to a strong force or impact during transfer and falling, the container will not be damaged even when made of paper.

By virtue of the variation of the spacing between the endless chains 20, 20 and the inclination thereof, the support pieces 25 of the delivering assembly 2 automatically engage the outer periphery of an upper portion of the conical container C to lift the container C from the stand 8. The assembly 2 is therefore very simple in construction, inexpensive to make and operable almost free of any trouble.

Since the conical container is lifted as held between a plurality of support pieces 25 utilizing the characteristic shape of the container C that it has a progressively increasing diameter toward the upper end, the container can be removed from the conveyor belt properly free of any damage even if made of paper and therefore susceptible to deformation or damage.

The support stand 8 has a pair of arched legs 9, 9 which are connected together by a bridge plate 80 formed with receiving portions 83 and is supported at four points, with two leg pieces 91 of each leg 9 clamping the connecting rod 15 and support bar 10 of the conveyor belt 1. Articles can therefore be supported on the stand with increased stability and reduced jolts during transport. When the ring 98 fitting around each leg 9 is pulled up to disengage the projections 99 on the ring 98 from the recessed portions 87 of the leg pieces 91, one leg piece 91 moves away from the other leg piece 91 by virtue of the elastic restoring force of the resin. Thus the stand 8 has the advantage that it is removable from the belt easily.

The present invention is not limited to what has been described above with reference to the drawings. Various modifications may be made by one skilled in the art without departing from the spirit of the invention. Such modifications are included within the scope of the invention.

What is claimed is:

1. In an apparatus disposed above a conveyor belt for feeding articles onto said conveyor belt, a system for conveying conical articles comprising a pair of circulating chains provided side by side on the opposite sides of a path of transfer of said conical article and spaced apart from each other by a distance slightly smaller than the largest diameter of said conical article, main shutters openably disposed at the downstream end of said transfer path for closing said path at a specified position, subshutters arranged on the upstream side of said main shutters for controlling transfer of a second conical article from the downstream end, a receiving assembly including a receiving piece disposed below the downstream end of said transfer path and an opening piece movable toward or away from said receiving piece for receiving between said pieces said conical article falling from said transfer path, an article detector for detecting that an article has reached the downstream end of said transfer path, a stand detector for detecting a stand on the conveyor belt passing below said receiving assembly, and a control unit for operating drive means coupled to said receiving assembly to reciprocate said opening piece once in response to every signal emitted from said stand detector and for emitting a signal for operating drive means coupled to said main shutters to reciprocate said main shutters once when receiving a signal from said article detector after the completion of the single reciprocation of said opening piece; said conveyor belt comprising a multiplicity of support bars arranged side by side and each having branches projecting from the opposite sides of said support bar, and a connecting rod attached to said branches on one side of each said support bar is engaged with said branches on the other side of adjacent said support bar.

2. A conveying system as defined in claim 1 wherein said stand comprises a pair of arched legs provided at its opposite ends and each having two leg pieces and a bridge plate interconnecting the upper ends of said legs and having article receiving portions, the lower ends of said leg pieces being formed on the inner side thereof with recessed engaging portions for fitting therein said support bar and said connecting rod respectively, each of said arched legs having a ring fitting around said two leg pieces and movable upward or downward.

3. A conveying system as defined in claim 2 wherein the inner side of said ring and said leg pieces are formed with projections and recessed portions engageable with and disengageable from each other.

* * * * *